United States Patent [19]
Dobeus et al.

[11] 3,866,942
[45] Feb. 18, 1975

[54] ROLLOVER PROTECTION APPARATUS

[75] Inventors: William J. Dobeus, Lake Forest; James V. Cheetham, Chicago; Daniel Pacheco, Libertyville; Carl A. Keyzer, Mundelein; Don G. Sandrock, McHenry, all of Ill.

[73] Assignee: Allis-Chalmers Construction Machinery Inc., Milwaukee, Wis.

[22] Filed: Aug. 16, 1973

[21] Appl. No.: 388,974

[52] U.S. Cl. ............................. 280/150 C, 296/102
[51] Int. Cl............................................. B62d 25/06
[58] Field of Search.................. 296/102; 280/150 C

[56] References Cited
UNITED STATES PATENTS

| 13,600 | 9/1855 | Nelson | 296/102 |
|---|---|---|---|
| 447,097 | 2/1891 | Zoller et al. | 296/102 |
| 1,312,422 | 8/1919 | Norton | 296/102 |
| 3,149,878 | 9/1964 | Heermann | 296/102 |
| 3,578,377 | 5/1971 | Babbitt, Jr. et al. | 296/102 |
| 3,612,581 | 10/1971 | Frankenberg et al. | 296/102 |

*Primary Examiner*—M. Henson Wood, Jr.
*Assistant Examiner*—Robert Saifer

[57] ABSTRACT

The mounting connections for the legs of the rollover protection structure for a vehicle are located below the floor of the operator's platform. The mounting brackets for the legs are rigidly secured to vertical braces of the operator's platform and so arranged that the pins for connecting the legs to the brackets may be easily installed and removed. A flexible bushing is used between the pins and the legs of the rollover protection structure so as to isolate the structure from the platform. Additionally, a horizontal sealing pad is placed between a shoulder on the lower part of each leg and the operator's platform which not only acts as a seal but also reduces relative motion between the rollover protection structure and the operator's platform in the direction of the axes of the mounting pins. The pins are oriented on parallel longitudinal axes at laterally opposite sides of the vehicle. On lateral deflection of the legs of the rollover protection structure when the vehicle overturns, a resisting moment is established by the pin connections and the cooperative abutment of the shoulders on the legs with the platform. Top and side panels may be added to the basic framework of the rollover protection structure to form a cab; in which event, the legs will depend below the bottom edge of the cab sidewalls. When a cab so constructed is removed from the vehicle and placed upon the ground or other support, the depending legs provide bottom clearance thereby minimizing damage to the bottom edges of the side panels.

5 Claims, 4 Drawing Figures

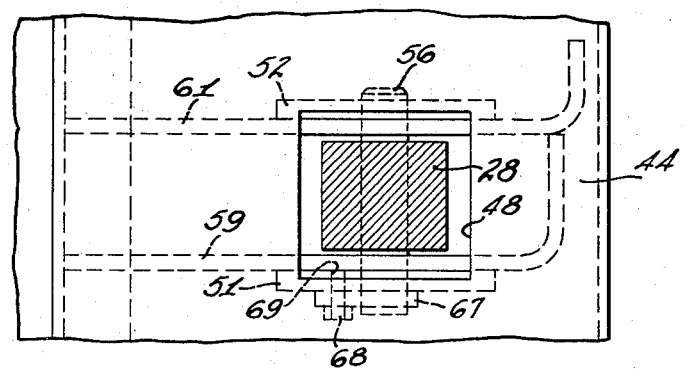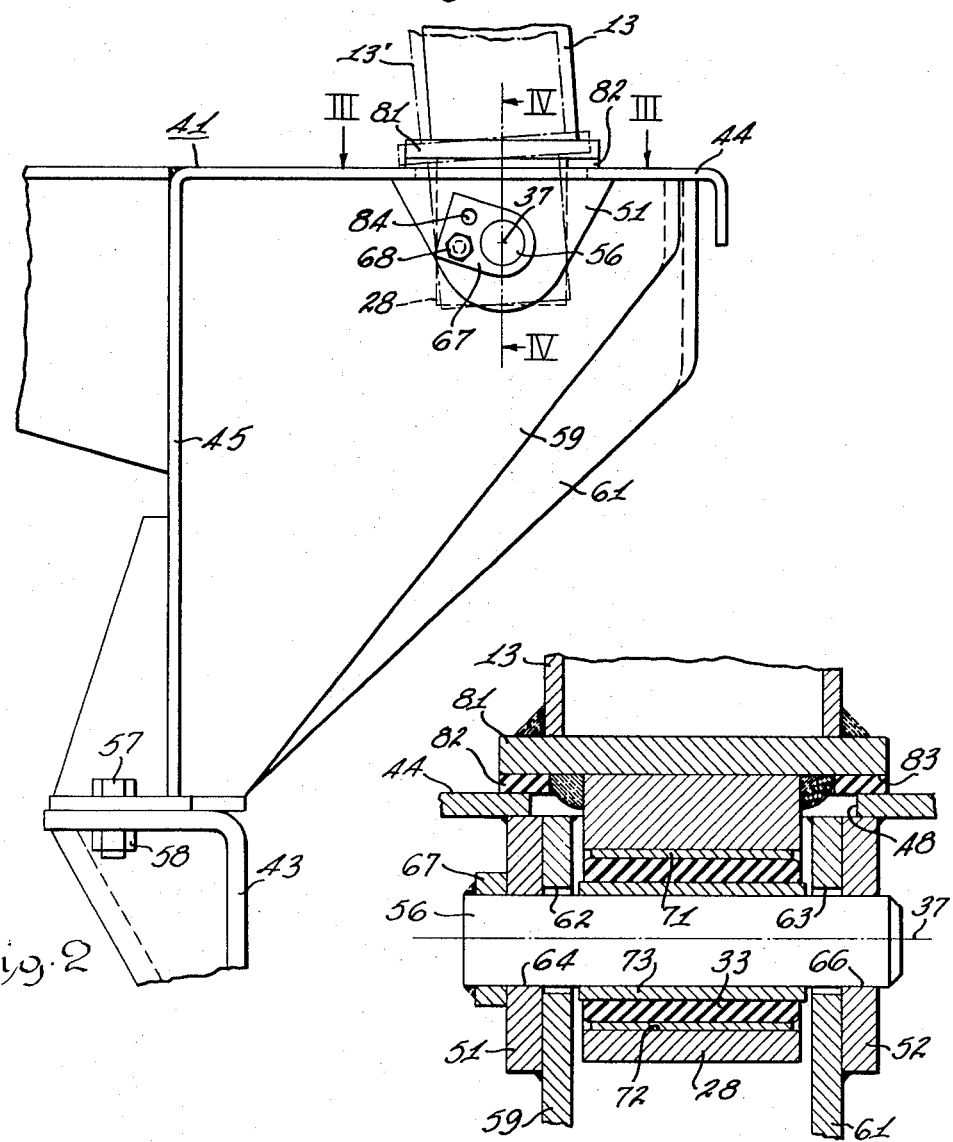

ROLLOVER PROTECTION APPARATUS

BACKGROUND OF THE INVENTION

Others have heretofore suggested rollover protection for vehicles wherein a rollover structure has legs that are secured to brackets on top of the operator's platform by resilient bushings. One such construction is illustrated in U.S. Pat. No. 3,572,819. Resilient connections between the legs of an operator protective structure and the vehicle chassis are shown in U.S. Pat. Nos. 3,036,858; 3,353,852; 3,203,728; 3,473,841; 3,527,474; 3,560,019; 3,612,581 and West German Pat. No. 1,185,074. Other resilient mountings of interest are shown in U.S. Pat. Nos. 3,341,247; 3,619,000; and 3,656,799. U.S. Pat. Nos. 3,036,858 and 3,527,474 show rollover protection structure having downwardly extending legs which are pivotally connected to the vehicle chassis by resilient bushings aligned parallel to the longitudinal axis of the vehicle.

BRIEF DESCRIPTION OF THE INVENTION

The vehicle is provided with an operator's platform having a generally horizontal floor in which openings are formed to receive downwardly extending legs of a rollover protection structure. The legs are provided with resilient bushings at their lower ends aligned on a pair of laterally spaced axes which are parallel to each other and parallel to the longitudinal axis of the vehicle. These resiliently bushed ends of the legs extend downwardly through the openings in the operator's platform floor and the platform includes suitable brackets with pin openings so that pins may be inserted below the platform floor to resiliently connect the rollover protection structure to the operator's platform. The openings in the platform are somewhat larger than the ends of the legs of the rollover protection structure thereby allowing some movement of the ends of the legs relative to the platform. A horizontally extending shoulder is formed on each of the legs a short distance above the floor of the operator's platform and a resilient seal member is placed between the shoulder and the platform so as to seal the leg of the rollover protection structure relative to the platform floor. This also insures isolation of the leg relative to the platform floor and prevents shifting movement of the rollover protection structure in the longitudinal direction of the vehicle, that is in the direction parallel to the axes of the pins which mount the rollover protection structure to the operator's platform.

BRIEF DESCRIPTION OF THE DRAWINGS

FIG. 2 is a partial front view showing the pin connection between the operator's platform and a leg of the rollover protection structure;

FIG. 3 is a section view taken along the line III—III in FIG. 2; and

FIG. 4 is a section view taken along the line IV—IV of FIG. 2.

DETAILED DESCRIPTION OF THE INVENTION

Figure 1:
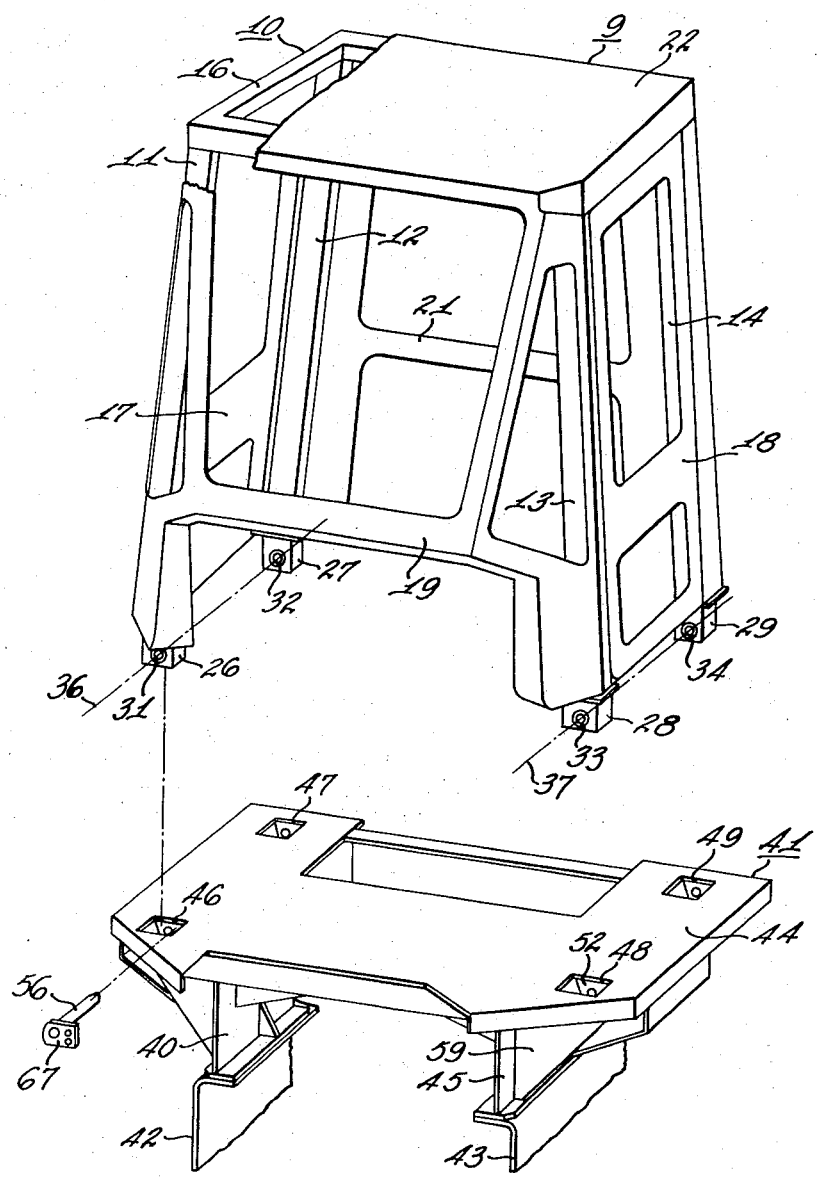
FIG. 1 is an exploded view of an operator's platform and rollover protection structure incorporating the present invention.

Referring to FIG. 1, the rollover protection structure 9 includes an overhead guard frame 10 comprising four legs 11, 12, 13, 14 secured as by welding to a rectangular top frame 16. In the illustrated embodiment of the invention, the rollover protection structure incorporates an operator's cab comprised of a pair of side panels 17, 18, a front panel 19, a rear panel 21 and a top panel 22 which are secured to the overhead guard frame 10. The side panels 17, 18 may be doors to the cab in which event they would be connected to the frame by appropriate hinges, not shown. The four legs 11, 12, 13, 14 of the rollover protection structure include downwardly extending end portions 26, 27, 28, 29 which extend below the side panels 17, 18. These end portions 26, 27, 28, 29 have cylindrical openings in which resilient bushings 31, 32, 33, 34 are installed. The inner diameter of the bushings 31, 32, 33, 34 are aligned on a pair of parallel and laterally spaced longitudinal axes 36, 37.

An operator's platform 41 is provided which includes a floor 44 and a pair of downwardly depending beams 40, 45 supported on main frame support members 42, 43. The floor 44 has four openings 46, 47, 48, 49 which are somewhat larger in size than end portions 26, 27, 28, 29 received in the openings. Each leg is supported on the platform by a pin extending through the bushing and supported at opposite ends by brackets welded to the underside of the floor 44. For instance, as shown in FIGS. 2, 3 and 4, end portion 28 is secured to the operator's platform by a pin 56 extending through bushing 33 and connected to brackets 51, 52.

Referring to FIG. 2, it will be noted that the frame member 43 is rigidly secured to the operator's platform 41 by a bolt 57 and nut 58. It should be understood that other nuts and bolts, not shown, are employed to complete the securing of the platform 41 to main frame members 42, 43. As shown in FIGS. 2, 3 and 4, the downwardly depending brackets 51, 52 are reinforced by vertical floor braces 59, 61, respectively, which have openings 62, 63 aligned with pin receiving bores 64, 66 of the brackets 51, 52. The floor braces 59, 61 are secured as by welding to the brackets 51, 52, to the floor 44 and to the beam 45. The pin 56 includes a flange 67 secured thereto as by welding which is held in place by a capscrew 68 in threaded engagement with a drilled and tapped opening 69 in bracket 51. As will be noted in FIG. 4, the resilient bushing includes an outer metal cylindrical sleeve 71 which is press fit into a bore 72 in the end portion 28 of the leg 13 and an inner metal cylindrical sleeve 73 which has a relatively close fit with pin 56. A resilient cylindrical sleeve 33 is sandwiched between the sleeves 71, 73 under a predetermined compression. It will be noted that the pin 56 and its brackets are readily accessible for installation and removal of the pin.

The lower end portion 28 of leg 13 includes a flange or shoulder 81 therearound which presents a downwardly facing surface 83 in confronting relation to the floor 44. A horizontal resilient seal pad 82 is compressed between the shoulder 81 and the floor 44 of the operator's platform. The seal pad 82 serves to isolate the leg 13 from the platform, seals the platform relative to leg 13 and prevents shifting of the rollover protection structure in the direction of the axis 37 of pin 56.

The pin connections between the lower end portions of the legs 11, 12, 13, 14 and the platform are similar in construction. The pins 56 for connecting legs 11 and 13 to their mounting brackets beneath the floor 44 may be installed and removed from the front side of the operator's platform, whereas the pins for connecting the rear legs 12 and 14 are installable and removable from the rear side of the platform.

During a vehicle rollover the rollover structure will usually be subjected to a lateral thrust causing some deformation or deflection of the structure. For instance, during a rollover on the vehicle left side, the leg 13 may pivot about pin 56 to the position shown by phantom lines 13', in which position the shoulder 81 is in thrust transmitting engagement with the floor 44 whereby such abutment and the pin connection establish a resisting moment to further swinging or deflecting movement of the leg 13.

The rollover protection structure is easily and quickly installed by inserting pins 56 and then screwing capscrews 68 into threaded openings 69. A threaded opening 84 is provided in the flange 67 of pin 56 to receive capscrew 68 when it is desired to remove the pin 56. The pin will be forced out of the bushing when the capscrew is threaded into opening 84 and the end of the capscrew engages the bracket 51. After backing the pin 56 out in this manner a short distance, a pry bar can be inserted between the flange 67 and the bracket 51 to further force the pin out.

By locating the pin connections below the floor of the operator's platform, upstanding brackets above the floor are eliminated. This permits a better fit of the cab, when an enclosed rollover protection structure is employed. Also, when the rollover protection structure with integral cab is placed on the ground the side panels are not likely to be damaged by objects on the ground because the end portions of the legs will provide substantial ground clearance therefor. The pin mounting brackets are integral with substantial vertical brace members of the platform which serve to also support a part of the floor disposed laterally outwardly of the longitudinal main frame members 42, 43.

The embodiments of the invention in which an exclusive property or privilege is claimed are defined as follows:

1. Rollover protection apparatus for a vehicle having an operator, platform including a floor, said apparatus comprising: a first pair of openings in said floor at one lateral side of said platform, a second pair of openings in said floor at the other lateral side of said platform, a rollover protection structure having a first pair of depending legs with bottom end portions extending into said first pair of openings and presenting longitudinally aligned bores, and a second pair of depending legs with bottom end portions extending into said second pair of openings and presenting longitudinally aligned bores, a resilient bushing in each of said bores, a pin extending through each of said bushings, and means connecting said pins to said platform below said floor, said means including vertical brackets secured to the underside of said floor and presenting front and rear holes for each of said pins, said brackets being integral with vertical bracing members for said floor.

2. The apparatus of claim 1 and further comprising top and side panels secured to said structure to form a cab, the lower edges of said side panels being disposed above the lower ends of said end portions of said legs.

3. Rollover protection apparatus for a vehicle having an operator's platform including a floor, said apparatus comprising: a plurality of openings in said floor, a rollover protection structure having a plurality of depending legs with bottom end portions extending into said openings, respectively, and means releasably connecting said bottom end portions to said platform below said floor, said means including an opening in each of said end portions, vertical brackets secured to the underside of said floor and presenting aligned holes and pins releasably mounted in said openings and holes, said brackets being integral with vertical bracing members for said floor.

4. Rollover protection apparatus for a vehicle having an operator's platform including a floor, said apparatus comprising: a first pair of openings in said floor at one lateral side of said platform, a second pair of openings in said floor at the other lateral side of said platform, a rollover protection structure having a first pair of depending legs with bottom end portions extending into said first pair of openings and presenting longitudinally aligned bores, and a second pair of depending legs with bottom end portions extending into said second pair of openings and presenting longitudinally aligned bores, a resilient bushing in each of said bores, a pin extending through each of said bushings, and means connecting said pins to said platform below said floor, each of said legs including a shoulder at the end portion thereof disposed in a downward confronting relation to said floor and said shoulders being adapted to move into thrust transmitting engagement with said floor upon predetermined lateral pivotal movement of said legs about said pins thereby resisting further pivotal movement of said legs.

5. The apparatus of claim 4 and further comprising a resilient pad between each of said shoulders and said floor.

* * * * *

UNITED STATES PATENT OFFICE
CERTIFICATE OF CORRECTION

Patent No. 3,866,942　　　　　　　　Dated Feb. 18, 1975

Inventor(s) William J. Dobeus et al.

It is certified that error appears in the above-identified patent and that said Letters Patent are hereby corrected as shown below:

On the Title page, in item 73 "Allis-Chalmers Construction Machinery Inc.," should read:

-- Fiat-Allis Construction Machinery, Inc. --.

Signed and sealed this 8th day of April 1975.

(SEAL)
Attest:

RUTH C. MASON
Attesting Officer

C. MARSHALL DANN
Commissioner of Patents
and Trademarks